United States Patent
Hoshi et al.

(10) Patent No.: US 7,944,787 B2
(45) Date of Patent: May 17, 2011

(54) METHOD FOR ADJUSTING A FOCUS POSITION ON AN OPTICAL DISC AND AN OPTICAL DISC APPARATUS APPLYING THE SAME THEREIN

(75) Inventors: Tomoya Hoshi, Fujisawa (JP); Toru Kawashima, Mito (JP); Atsushi Yamada, Saitama (JP); Mitsuru Harai, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 246 days.

(21) Appl. No.: 12/218,578

(22) Filed: Jul. 15, 2008

(65) Prior Publication Data

US 2009/0059755 A1 Mar. 5, 2009

(30) Foreign Application Priority Data

Aug. 27, 2007 (JP) ................................ 2007-219764

(51) Int. Cl.
*G11B 7/00* (2006.01)
(52) U.S. Cl. ................ 369/47.55; 369/44.29; 369/53.28
(58) Field of Classification Search ........................ None
See application file for complete search history.

(56) References Cited

U.S. PATENT DOCUMENTS

2002/0131195 A1* 9/2002 Dehnert ...................... 360/78.07
2005/0249059 A1* 11/2005 Wang et al. ................. 369/44.27

FOREIGN PATENT DOCUMENTS

| JP | 2000-155961 | 6/2000 |
| JP | 2001-184678 | 7/2001 |

\* cited by examiner

*Primary Examiner* — Joseph Haley
(74) *Attorney, Agent, or Firm* — Kilpatrick Townsend & Stockton LLP

(57) ABSTRACT

In a method for adjusting a focus position for an optical disc, onto/from which in formation is recorded or reproduced, while adjusting the focus position of an optical reproducing means, upon a recording surface of an optical information recording medium having an area where information of the optical information recording medium is recorded in advance, comprising the following steps of: memorizing plural numbers of information relating to focus positions determined appropriately, which can be obtained from the area where the information of the optical information recording medium is recorded in advance; and adjusting the focus position for the optical disc loaded into an apparatus, from at lease one (1) signal relating to the focus position, which can be obtained from the optical disc, with utilizing a relationship between the plural numbers of information relating to the focus positions determined appropriately, memorized in advance, when reproduction of the information is impossible when the optical disc is loaded into the apparatus, thereby providing the focus position adjusting method and an optical disc apparatus applying the same therein, for enabling an appropriate focus adjustment even in case when DMA area cannot read out due to damages or defects therein.

4 Claims, 7 Drawing Sheets

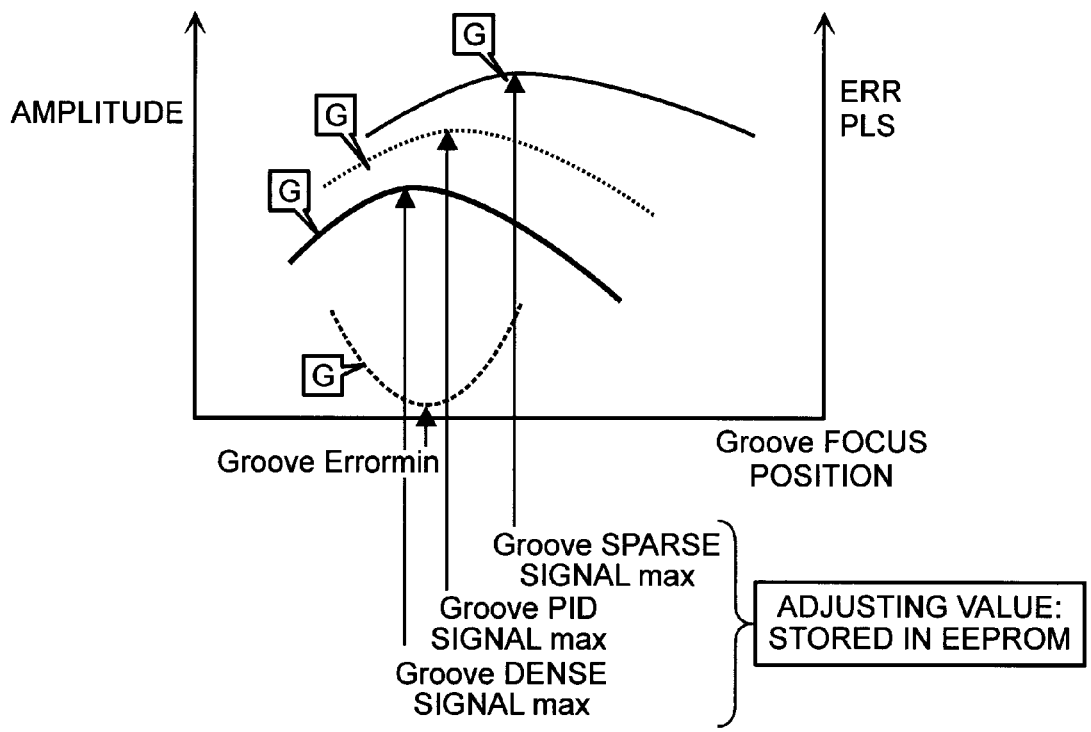
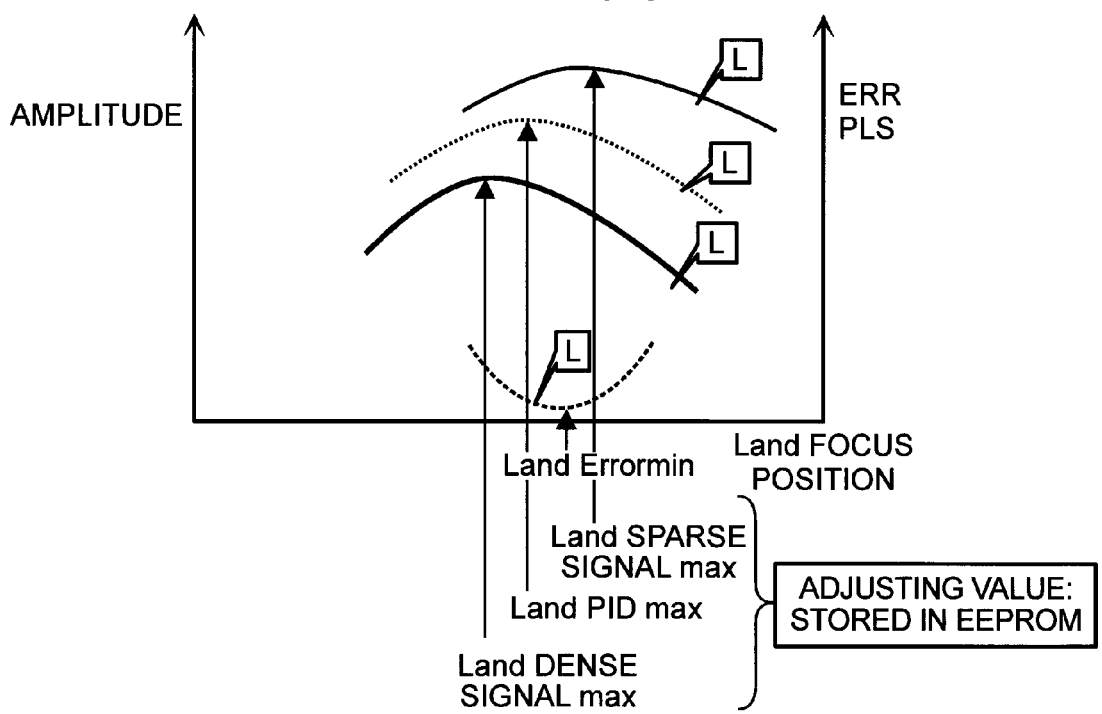

METHOD FOR ADJUSTING A FOCUS POSITION ON AN OPTICAL DISC AND AN OPTICAL DISC APPARATUS APPLYING THE SAME THEREIN

BACKGROUND

The present invention relates to a method for adjusting a focus position on an optical disc, within an optical disc apparatus for recording/reproducing information onto/from an optical disc, and an optical disc apparatus applying the same therein.

Due to appearances of recording media having a large capacity thereof, such as, HD-DVD and BD, etc., in recent years, an optical disc apparatus, for recording information by irradiating a laser beam on an optical disc, i.e., a disc-like recording medium, or for reading out information recorded thereon by converting the reflection light thereupon into an electric signal, is widely applied into various kinds of electronic apparatuses, such as, a personal commuter or the like, for example, as an information recording medium therein.

Further, in such the optical disc apparatus, there is necessity of adjusting a focus position of a laser beam irradiated on an optical disc, when recording/reproducing information onto/from the optical disc, and for this reason, a focus control apparatus/method is already known in the following Patent Documents, etc., for example.

Patent Document 1: Japanese Patent Laying-Open No. 2000-155961 (2000); and
Patent Document 2: Japanese Patent Laying-Open No. 2001-184678 (2001).

BRIEF SUMMARY

Thus, within the focus control apparatus known by the Patent Document 1 mentioned above is memorized, for example, on a production line thereof, such a focus position information that an error comes down to be the minimum, in advance, and thereafter that focus position information is applied to be a start point of focus position adjustment. And, as an adjusting method in the apparatus, the data memorized (i.e., the focus position information) is reproduced, on the other hand if that data is not yet recorded, then that data is reproduced while recording that data in a drive test area at the same time, and thereby setting up or determining the focus position between the position for bringing the error down to the minimum, and the position brining the amplitude of RF signal up to the maximum.

Also, with the focus control method known by the Patent Document 2 mentioned above, in particular, in case when a defect information management zone (i.e., so-called DMA (Defect Management Area)), being an area where information should be recorded therein, in advance, is not recorded yet in the condition thereof, a PID area is reproduced, so as to determine the focus position so that an error amount of PID comes down to the minimum, and then recording/reproducing of information is conducted in the drive test zone, thereby determining the focus position within a land area and a groove area, in such a manner that a jitter amount of the reproduced signals or a data error amount of that reproduced signals comes down to the minimum. Or, in case when the information is recorded in the defect information management zone, the focus position is determined, while reproducing the signal recording in the defect information management zone, so that the jitter amount or the data error amount of that signal comes down to the minimum, and thereby achieving control upon recording or reproduction of the information.

However, with such the conventional arts mentioned above, in particular, when the DMA (Defect Management Area) portion of an optical disc cannot be read out due to damages or defects thereof, recording/reproducing of information must be conducted in the drive test zone, then there is a problem that the time for an adjustment comes to be long. In particular, also in the method of conducting recording/reproducing of data in the drive test area, a mark configuration recorded varies depending on the focus position when recording, and therefore, there is a problem that an adjustment made for bringing the data error amount down to the minimum at that recording signal does not always enable to obtain a preferable beam spot configuration (for example, a least circle of confusion) therewith.

Then, according to the present invention, being accomplished by taking the problems in the conventional arts mentioned above into the consideration thereof, an object thereof is to provided a method for adjusting focus position on an optical disc and an optical disc apparatus applying the same therein, for enabling a suitable or appropriate focus control even in case when that DMA (Defect Management Area) portion cannot be read out due to the damages or the defects thereof.

For accomplish the object mentioned above, according to the present invention, first of all, there is a method for adjusting a focus position for an optical disc, onto/from which information is recorded or reproduced, while adjusting the focus position of an optical reproducing means, upon a recording surface of an optical information recording medium having an area where information of said optical information recording medium is recorded in advance, comprising the following steps of: memorizing plural numbers of information relating to focus positions determined appropriately, which can be obtained from the area where the information of said optical information recording medium is recorded in advance; and adjusting the focus position for said optical disc loaded into an apparatus, from at lease one (1) signal relating to the focus position, which can be obtained from said optical disc, with utilizing a relationship between said plural numbers of information relating to the focus positions determined appropriately, memorized in advance, when reproduction of said information is impossible when the optical disc is loaded into said apparatus.

In addition thereto, also for accomplishing the object mentioned above, according to the present invention, there is also provided an optical disc apparatus, for recording or reproducing information onto/from an optical information recording medium having an area where information is recorded in advance, in a part thereof, comprising, at least: a unit, which is configured to rotationally drive the optical information recording medium loaded into said apparatus; an optical reproducing unit, which is configured to irradiate a light beam for recording/reproducing the information upon a recording surface of the optical information recording medium, which is rotationally driven by said rotationally driving unit; and a controller unit, which is configured to adjusting a position of said optical reproducing unit in a radial direction of the optical information recording medium, and also a focus portion of the light beam irradiated upon the recording surface of said optical information recording medium, wherein said controller unit memorizes plural numbers of information relating to focus positions determined appropriately, which can be obtained from the area where the information of said optical information recording medium is recorded in advance; and adjusts the focus position for said optical disc loaded into an apparatus, from at lease one (1) signal relating to the focus position, which can be obtained from said optical disc, with utilizing a relationship between said plural numbers of information relating to the focus positions determined appropriately, memorized in advance, when reproduction of said information is impossible when the optical disc is loaded into said apparatus.

Further, according to the present invention, within the method for adjusting a focus position for an optical disc or the optical disc apparatus applying the same therein, as described in the above, it is preferable that the plural numbers of information, which can be obtained from the area where the information is recorded in advance, includes a focus position for brining amplitude of a densest signal up to a maximum, a focus position for bringing amplitude of a sparse signal up to a maximum, and a focus position for bringing amplitude of a PID (Physical Identification Data) signal up to a maximum, and further that at least one (1) signal relating to the focus position obtainable from said optical disc is said PID signal, if the information cannot be reproduced from the area where the information is recorded in advance, when loading the optical disc into said apparatus.

As was mentioned above, according to the present invention, there can be achieved a practically superior effects of providing

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIGS. 8(*a*) and 8(*b*) are views for showing various kinds of examples of relationship between a focus position and amplitude, which are used in the above-mentioned focus position adjusting method for the optical disc;

DETAILED DESCRIPTION OF THE PREFERRED EMBODIMENTS

Hereinafter, exemplary embodiments according to the present invention will be fully explained by referring to the attached drawings.

First of all, explanation will be given on an outlook of the structures of an optical disc apparatus, according to an exemplary embodiment of the present invention, by referring to FIG. 1 attached herewith. However, the optical disc apparatus shown in the block diagram of this FIG. 1 is an optical disc apparatus, being able to read/write onto a disc-like high-density information recording medium, such as, DVD-RAM, etc., for example, i.e., the optical disc.

Figure 1:
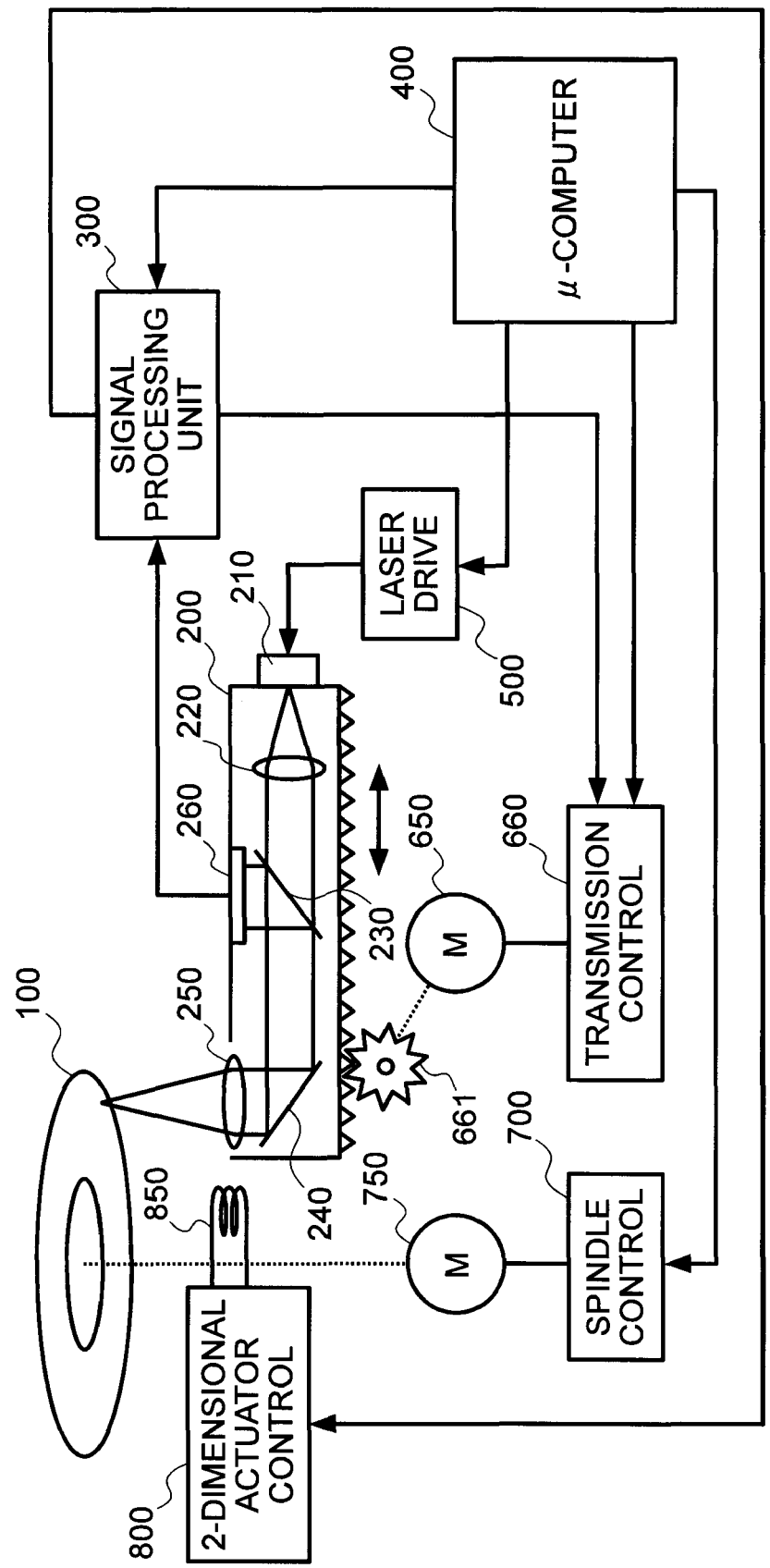
FIG. 1 is a block diagram for briefly showing the structures of an optical disc apparatus according to an exemplary embodiment of the present invention.

In this FIG. 1, a reference numeral 100 depicts the optical disc mentioned above (for example, DVD-RAM, etc.). Also, a reference numeral 200 depicts an optical pickup, within an inside of which is constructed an optical reproducing means, including a semiconductor laser 210, e.g., a light emitting element for generating a laser beam having a desired wavelength, a collimator lens 220 for brining the laser beam emitted into a parallel light, a half mirror 230 for guiding an incident light onto a mirror, which will be mentioned later and also a reflection light onto a light receiving element, which will be mentioned later, a mirror for changing the direction of lights, an objective lens 250 for irradiating the laser beam on a recording surface of the optical disc 100 mentioned above while focusing it into a predetermined beam radius, and a light receiving element 260 for detecting the reflection light upon the half mirror 230 mentioned above.

However, in this embodiment, for the purpose of changing the focus distance of the objective lens 250 in conformity with thickness of the optical disc 100, normally, a tracking servo is working, and in that case since a stable point lies at the most suitable position, it is so constructed that the lens can be horizontally shifted to another tracking stable point of lens, to be received therein, instantaneously, upon applying a pulse signal to the tracking control system when moving the lens.

Also, in FIG. 1, a reference numeral 300 depicts a signal processing portion or unit for conducting predetermined processes upon an electric signal, which is converted from the reflection light detected by the light receiving element 260 mentioned above, wherein this signal processing unit 300 is connected to a micro-computer (hereinafter, being mentioned by "μ computer", simply) 400, which is provided for controlling an entire of the optical disc apparatus, thereby conducting various controls thereupon, including a focus controlling method that will be mentioned in details thereof hereinafter. Thus, this μ computer 400 is connected with a laser driver part or unit 500, a transmission controller part or unit 660, a spindle controller part or unit 700, and a two-dimensional actuator control circuit 800, so that it can achieve various controls.

Thus, with such the structures as mentioned above, the μ computer 400 controls current to be supplied to the semiconductor laser 210, e.g., the light emitting element of the optical pickup 200, being the optical reproducing means mentioned above, thereby controlling strength or intensity of the light emission thereof, and/or it controls rotation of a motor 650 for use of transmission control, thereby controlling the position of the optical pickup 200, in particular, in the radius direction of the optical disc 100. In this embodiment, although a moving mechanism of the optical disc 100 in the radius direction is shown or indicted by a gear 661, provided for moving the optical pickup 200 through rotation of the motor 650 for use of transmission control mentioned above; however, the present invention should not be limited to this.

Also, the μ computer 400 mentioned above controls the rotation of the motor 750 for rotationally driving the spindle, thereby achieving CLV (Constant Linear Velocity) or ZCLV (Zoned Constant Linear Velocity), e.g., a control of a linear speed constant that is widely applied to the high-density information recording medium mentioned above. Further, this μ computer 400 achieves the focus position control of the objective lens 250 in the optical pickup 200, through the two-dimensional actuator control circuit 800, for example, with using an electro-magnetic coil 850, etc., as an actuating means thereof. Further, herein, two-dimensional position control achieve through this two-dimensional actuator control circuit 800 includes, in addition to the position control (i.e., a focus control) of the optical lens 250, in particular, in the direction perpendicular to the recording surface of the optical disc 100, further a tracking position control for following a track through a minute positional adjustment in the radial direction, being perpendicular thereto, and further a control of the above-mentioned optical lens 220 for use of light condensing.

Now, the optical disc apparatus, having such the structures mentioned above, interprets commands and/or information data from a host not shown in the figure (i.e., external equipment), such as, a personal computer, etc., for example, within an interface control circuit (not shown in the figure), and executes recording/reproducing of information and seek operation, etc., under the μ computer 400. And, it is also able to record the information through the optical pickup 200 onto the optical disc, by conducting signal conversion within the signal processing unit 300, and further, while demodulating various kinds of signals, which are read in through the light receiving element 260, into the original data, through the signal processing unit 300, it is also possible to transmit that demodulated data from the interface controller circuit to the host, responding to a command for reproducing. However, herein will be omitted the explanation of details of the recording/reproducing operation of the information.

Figure 3:
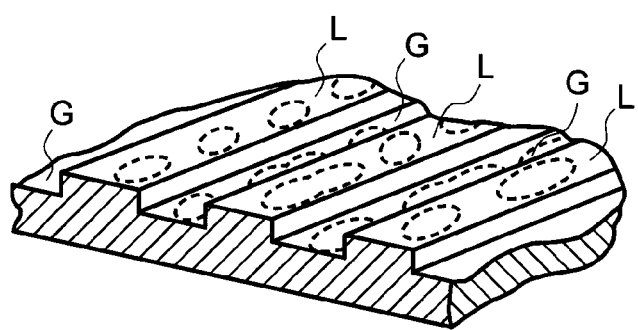
FIG. 3 is an enlarged perspective view of information recording portion, on the DVD shown in FIGS. 2(*a*) and 2(*b*), including the cross-section of a land area and a groove area graph thereof.
Figure 4:
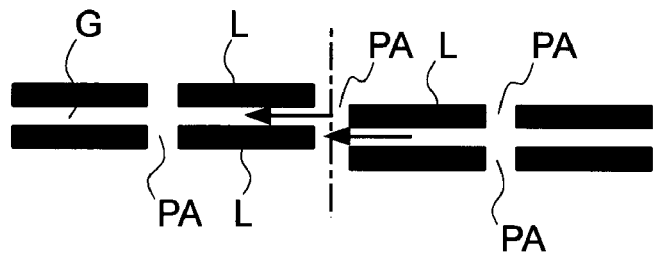
FIG. 4 is a view for explaining formats for forming the land area and the groove area on the DVD shown in FIGS. 2(*a*) and 2(*b*)

Next, detailed explanation will be made on the optical disc 100, in particular, that so-called "DVD-RAM", among the information recording media mentioned above, by referring to FIGS. 2(*a*) to 5. First of all, FIGS. 2(*a*) and 2(*b*) are outlook view of the optical disc 100, onto/from which the information is recorded/reproduced by the optical disc apparatus, and in particular, FIG. 2(*a*) shows a perspective view and FIG. 2(*b*) a plane view thereof, respectively. Also, FIG. 3 is a partial perspective view of the land "L" and the groove "G" on the optical disc 100, including the cross-section view thereof. FIG. 4 is a view for explaining a format for forming the land "L" and the groove "G" on the optical disc 100. And, FIGS. 5(*a*) and 5(*b*) are an enlarged perspective view of a part of a pit address area or region that is defined between the land "L" and the groove "G" on the optical disc 100.

Figure 2A:
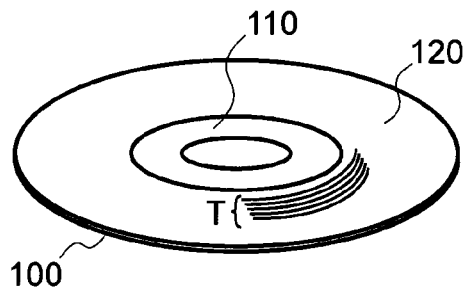
FIGS. 2(*a*) and 2(*b*) are outlook views of DVD, i.e., an optical disc, onto/from which information can be reproduced/recorded with the optical disc according to the exemplary embodiment of the present invention.
Figure 2B:
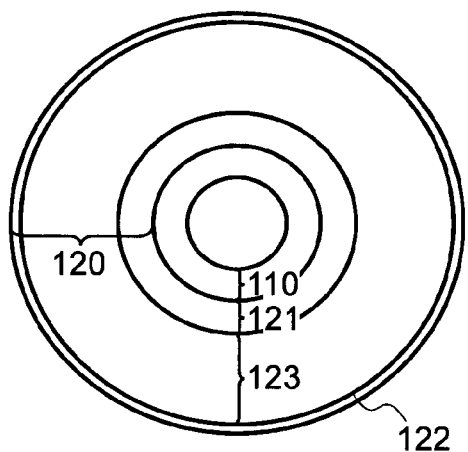

First, explaining the optical disc 100 shown in FIGS. 2(*a*) and 2(*b*), in particular, upon a recordable medium being called "DVD-RAM", among such optical discs, the information can be written through production of a mark (e.g., a pit) of crystalline or amorphous condition by irradiation of a laser light, i.e., utilizing a phase change, for example, upon the recording layer on a transparent substrate thereof. And, thereafter, the information recorded on the optical disc 100 can be reproduced by reading out the changes of light reflectivity between the crystalline and amorphous resulting from producing the mark (e.g., the pit). However, the optical disc 100 shown in FIGS. 2(*a*) and 2(*b*) is the recordable information recording medium, being called "DVD-RAM", as a representative example thereof, and as is shown in FIGS. 2(*a*) and 2(*b*), it is divided into two (2) areas, i.e., a ROM area 110 recording a predetermined control data in a central portion thereof, and a RAM area 120 on the periphery of that. And, on the optical disc mentioned above, as is shown in FIG. 2(*b*), in particular, within the RAM area 120 mentioned above, for the purpose of increasing the recording density thereof, there are formed a concave area and a convex area, separately, being called the land and the groove, as information recording portion, along a spiral track "T" for recording the information continuously on the disc, and thereby enabling recording and reproducing of the information.

Further, the RAM area 120 mentioned above is divided into several areas or regions, and in more details, it comprises management areas 121 and 122 for information relating to apparatus control, on an inside and an outside of the RAM area 120, and between them is provided a user area 123, in which a user information can be written. And, those management areas 121 and 122 can be divided into, but herein not shown in the figure, in more details thereof, a PID area (Physical ID), a disc test zone, a drive test zone, a defect information management zone, etc. The drive test zone can be also used, as the write-in area, when conducting a pre-write operation or the like. The defect information management zone is an area where the defect management information of the disc is recorded, and it may be called, the "DMA area (DMA portion)" mentioned above, too. Further, the user area 123 mentioned above is built up with a plural number of areas (or, zones), which are further divided into plural numbers in the radius direction.

Next, FIG. 3 shows the cross-section of the land "L" and the groove "G" of such the information recording portion. Those land "L" and groove "G" are formed, alternately, in the radius direction of the disc-like recording medium 100, and on those land "L" and groove "G" are recorded the information, by producing the mark as shown by broken lines in the figure, different from portions other than that in the condition (i.e., the amorphous condition or the crystalline condition).

Also, in FIG. 4 is shown the format for forming the land "L" and the groove "G" on the high-density information recording medium mentioned above, and in this figure, the land "L" is depicted by slanted portions, while the groove "G" is defined between those slanted portions. And, the land "L" and the groove "G" are formed, changing between the land "L" and the groove "G", alternately, by a unit of one (1) turn of the optical disc 100. However, in this figure, the land "L" and the groove "G" are switched over on the boundary of a one-dotted broken line. Also, those land "L" and groove "G" are made up with a plural number of units, each being called "sector", and each sector is divided by an area, being called "pit address (PA)" area or region, respectively. Further, the RAM area 120 within the disc is divided into a plural number of areas (e.g., zones) directing from the inner periphery to the outer periphery thereof. Each area comprises the same number of sectors therein, in the structure thereof.

Figure 5A:
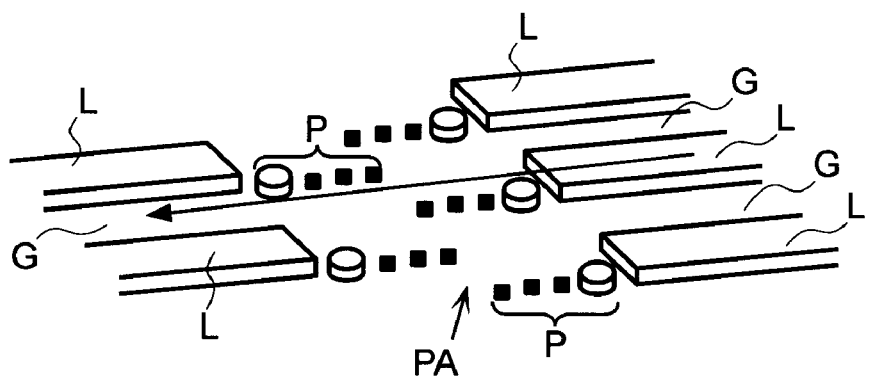
FIGS. 5(*a*) and 5(*b*) are partial enlarged perspective views for showing a pit address area, which is formed between the land area and the groove area on the DVD shown in FIGS. 2(*a*) and 2(*b*)

Further, in FIGS. 5(*a*) and 5(*b*) is show the pit address area or region, which is defined between those land "L" and groove "G". Firstly, in FIG. 5(*a*) is shown a portion where the laser beam shifts from the land "L" to the groove "G" (i.e., the pit address area at the portion of the one-dotted broken ling in FIG. 4 mentioned above), wherein the laser beam for detecting the recorded signal is shifted, for example, from land "L" to the groove "G" passing through this pit address area PA, for example, as is shown by an arrow in the figure.

Figure 5B:
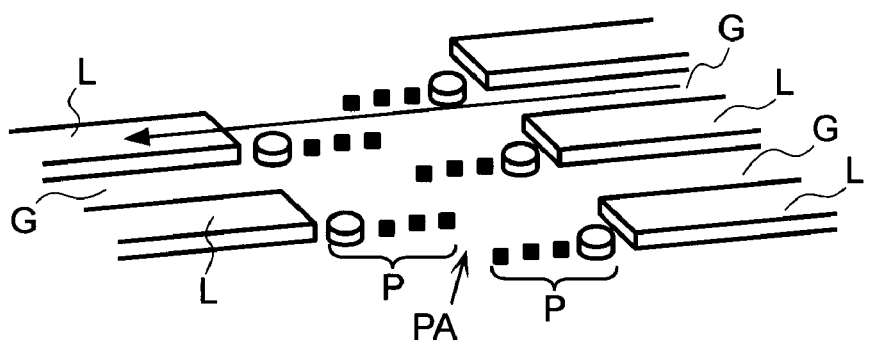

On the other hand, in FIG. 5(b) is shown a portion where the laser beam is shifted from the groove "G" to the land "L", herein also, the laser beam for detecting the recorded signal is shifted from the groove "G" to the land "L" through this pit address area PA, for example, as is shown by an arrow in the figure. However, it is needless to say that the laser beam passes through the pit address, in the similar manner to the above, also when shifting from this land "L" to the next groove "G".

With such the optical disc 100 explained in the above, the information is recorded on the land "L" and the groove "G", alternately, different in the height thereof. For this reason, in order to reproduce the information from such the optical disc 100, with certainty, it is necessary to control, optimally, the optical pickup, as an optical reproducing means for reproducing the information with using reflection of the laser beam, in particular, the focus position of the optical lens (i.e., the objective lens) for condensing and irradiating the laser beam upon the surface of the recording medium, with respect to those land "L" and groove "G", respectively, being optically different from each other in the height thereof. Further, due to an aberration or the like in the detection system, it is also necessary to apply offsets on the land and the groove, different from each other. Also, at the same time, address numbers on the optical disc 100 mentioned above are recorded on the pit address area PA, by means of a plural number of pit trains P, P . . . , on both sides thereof. For this reason, in order to reproduce the information from such the optical disc 100, it is necessary to detect those plural numbers of pits P on this pit address area PA, correctly.

Then, upon reproduction of the information from the optical disc 100 mentioned above, it is important to control the focus position of the optical lens within the optical reproducing means, i.e., to conduct an optimal position control, and at the same time, it is also necessary to detect the pit train P of recording the address number on the pit address area PA, with certainty. Also, not shown in FIGS. 3 through 5(b) mentioned above, on the boarder of the land "L" and the groove "G" in the radial direction thereof, there is formed a wobble (i.e., a method of minutely wobbling the groove in the radius direction) wobbling, which is obtained by modulating the address information around a certain frequency. A number of wobbling per one (1) turn thereof is detected through a wobble detector circuit (not shown in the figure), thereby achieving an efficient and stable rotation control of the motor 750 through the spindle controller unit 700 mentioned above.

Also, the pit address area PA mentioned above is divided into two (2) in the peripheral direction, and in each of them is provided or formed the pit train P, respectively. And, comparison of ID signals obtained from those two (2) pit trains P enables to identify the data of the sectors neighboring to each other.

Figure 6:
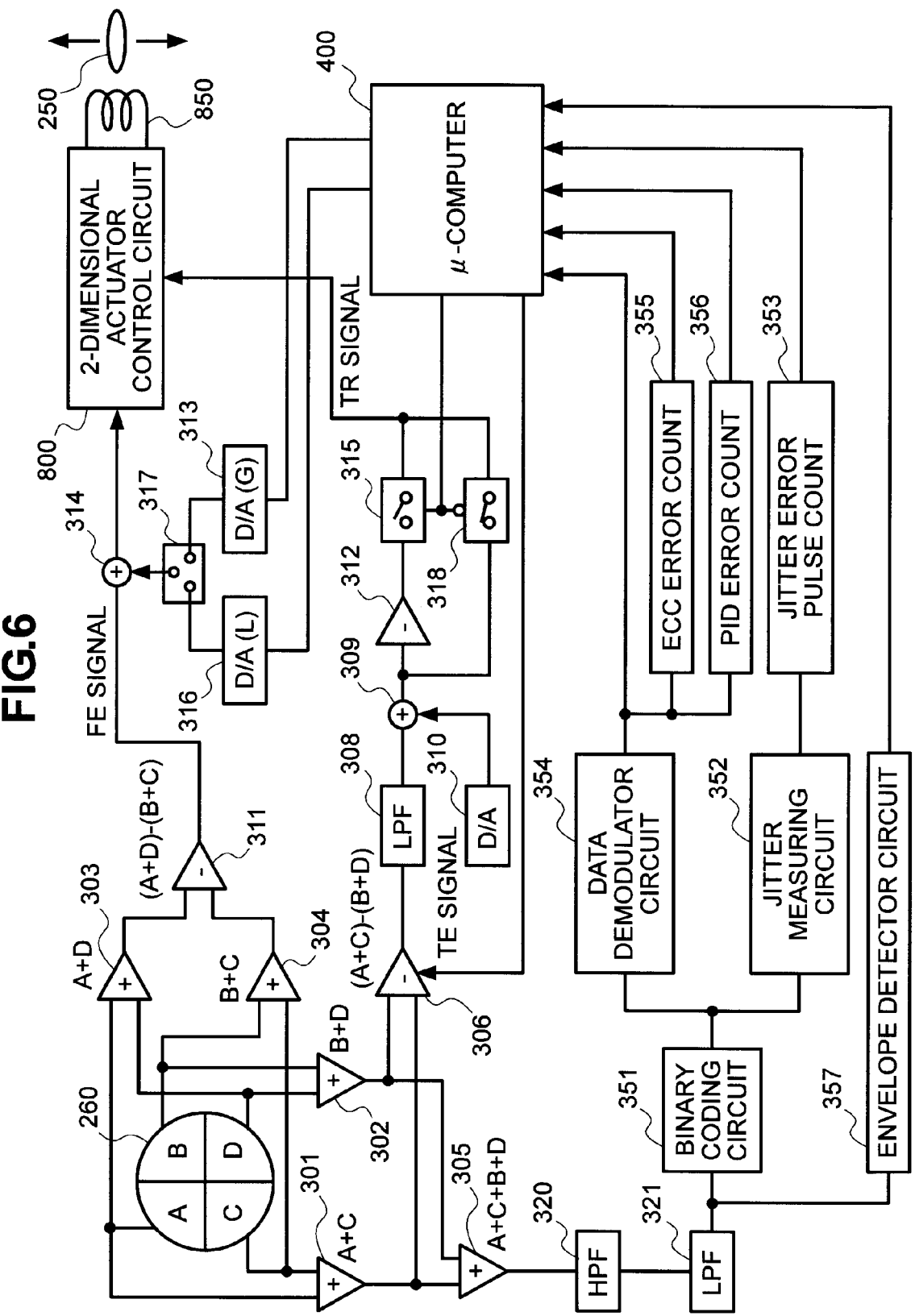
FIG. 6 is a block diagram for showing the detailed structures of the optical disc apparatus mentioned above, including an optical pickup as an optical reproducing means therein, also a signal processor unit for processing a detection signal thereof, and further peripheral portions thereof.

Next, in FIG. 6 attached herewith are shown the optical disc apparatus for conducting recording/reproduction onto/from the optical disc mentioned above, according one exemplary embodiment of the present invention, in particular, including the detailed structures of the optical pickup 200, as the optical reproducing means thereof, the light receiving element 260 and the signal processing unit 300 for processing the detection signal therefrom, and further peripheral portions thereof.

As is apparent from FIG. 6, the light receiving element 260 is divided into four (4) pieces of detector portions A, B, C and D, wherein the reflection lights, being reflected upon the recording surface of the optical disc 100, are incident upon this light receiving element 260, and are converted into electric signals by the detector portions divided, respectively, to be outputted therefrom. Further, the outputs from those detectors A, B, C and D are inputted into adder circuit 301-304, and thereby conducted therein the following additions, respectively; i.e., (A+C), (B+D), (A+D) and (B+C). Further, the outputs from the adder circuits 301 and 302 are inputted into another adder circuit 305; thereby outputting a sum signal (i.e., FR signal), adding all the outputs from the detector portions A, B, C and D mentioned above, (A+B+C+D), therefrom.

And, outputs from the adder circuits 301 and 302, at the same time, are also supplied to a subtractor circuit 306, and with this, at an output thereof is provided so-called a tracking error signal TE, i.e., a signal for the tacking control that can be expressed by ((A+C)−(B+D)).

On the other hand, this tracking error signal TE, at the same time, after passing through a low-frequency pass filter (LPF) 308, is added with an offset value from a D/A converter 310 through an adder 309. For the purpose of the tracking control on the groove "G", first of all, the tracking error signal TE is reversed in the polarity thereof through a reverser circuit 312, and further, through a switching element 315 it is outputted to the two-dimensional actuator control circuit 800 mentioned above. On the other hand for the purpose of the tracking error on the land "L", thereafter, it is also outputted to the two-dimensional actuator control circuit 800 through a switching element 318. However, to one of the switching elements, i.e., the switching element 318, which the tracking error signal for the land "L" passes through, is inputted a L/G exchange signal through the reverser circuit 312. Thus, with this, it outputs a tracking control signal for the land "L" and a tracking control signal for the groove "G", alternately, to the two-dimensional actuator control circuit 800, upon basis of the tracking error signal TE. This output is turned into a TR signal for controlling the control of tacking, and thereby controlling the position of the optical pickup 200 in the radial direction by means of the transmission controller unit 660 shown in FIG. 1. However, to the D/A converter 310 is supplied the offset value from the μ computer 400 through an A/D converter thereof. However, the detailed explanation will be omitted, because of a mote relation thereof with the present invention.

Also, the signals (A+D) and (B+C), being outputted from the adder circuits 303 and 304 mentioned above, are inputted into a subtractor circuit 311, and with this, there can be obtained a focus error signal FE that can be expressed ((A+D)−(B+C)). Further, this focus error signal FE is divided into a focus error signal FE on the land "L" and a focus error signal FE in the groove "G", to be processed, and thereafter, they control the focus position (in the direction perpendicular to the recording surface of the optical disc 100) of the objective lens 250 of the optical pickup 200, through the two-dimensional actuator control circuit 800.

Thus, the focus error signal FE ((A+D)−(B+C)), an output from that subtractor circuit 311, being applied with a focus offset through an adder 314, is outputted to the two-dimensional actuator control circuit 800. Offset setups in the groove "G" and on the land "L" within D/A converter 313 and D/A converter 316 are applied into the adder 314 through an analog switch SW 317. Further, to those D/A converters 313 and 316 are provided offset values for the focus control in the groove "G" and on the land "L", respectively, from the μ computer 400. Also, to a control input of the analog switch SW 317 mentioned above is inputted the exchange control signal that is outputted from the μ computer 400, i.e., the exchange signal between the land "L" and the groove "G".

Also, according to the exemplary embodiment of the present invention, the offset values to be added to the focus error signal FE, through the D/A converts 313 and 316 mentioned above, are variables varying as a result of learning in a learning control, which is adapted for controlling the focus position of the optical lens at the optimal position thereof. Further, at the time when shipping out this optical disc apparatus as a product or the like, shipment is made by setting each of them at a predetermined initial value thereof. Each of the initial set values is recorded in EPROM or the like, as a recoding means of the μ computer 400. Further, a sum signal (A+B+C+D) from the adder circuit 305, passing through a high-frequency pass filter (HPF) 320, a low-frequency pass filter (LPF) 321, and thereafter it is demodulated into information recording data within a data demodulator circuit 354 through a binary coding circuit 351, to be taken into the μ computer 400 as the data read out from the optical disc 100. Also, within the present embodiment, at the same time when conducting the data demodulation are taken ECC error count and PID error count into the μ computer 400, through counters 355 and 356, respectively. A jitter measuring circuit 352, as will be mentioned later, converts the data upon basis of a jitter amount, i.e., an output of the binary coding circuit 351, into a jitter pulse number. This pulse number is taken into the μ computer 400, through a jitter error pulse counter 353, for example.

By the way, in general, when recording/reproducing the information recorded on the optical disc by the optical disc apparatus according to the conventional art mentioned above, reproduction is made on the data (i.e., the focus position information) that is recorded in part of that information recording area or region, i.e., the defect information management zone (DMA area), so as to conduct the optimal position control for the focus position. However, in case when no such the data is recorded in that area or region (i.e., non-recording), while recording data in the drive test area, as well, reproduction is made on that data recorded, and the focus position is set up or determined in between thereof, where the error falls down at the minimum and the amplitude of RF signal goes up at the maximum (see, the Patent Document 1 mentioned above). Or, alternatively, in case where the information is recorded in the defect information management zone (DMA area), the focus position is determined in such a manner that the jitter amount or the data error amount falls down to the minimum while reproducing the signal recording in that area or region, on the other hand, in case when the DMA area is in the non-recording condition, then the focus position is determined so that the error amount of PID falls down to the minimum while conducting reproduction on the PID area, and further while conducting recording/reproducing of the information in the drive test zone, the focus position is determined on the land area and in the groove area so that the jitter amount of that reproduction signal or the data error amount of that reproduction signal falls down to the minimum (see, the Patent Document 2 mentioned above).

However, as was mentioned above, in case when the defect information management zone (DMA area) cannot be reproduced due to the damages or defects thereof, as was mentioned previously, it is impossible to achieve the focus adjustment. Then, according to the present invention, on the production line, in advance, is memorized the information of the focus position ($P_{PIDmax}$) brining the focus position ($P_{adj}$) and a level of PID (Physical Identification) signal up to the maximum (max), as the result of adjusting the focus position. And, in case when adjusting the focus position depending upon the amplitude information in that defect information avengement zone (DMA area), and in particular, when that DMA area cannot be reproduced due to the damages or defects thereof, an appropriate or proper focus position is determined from the above-mentioned information (e.g., $P_{PIDmax}$ and $P_{adj}$) that were already recorded in advance, for example, and the focus position at which the level of that PID signal is at the maximum (max), while actually changing the focus position (i.e., under the condition of closing a focus position control loop) after loading the optical disc.

According to the exemplary embodiment of the present invention, as a method for obtaining the optimal focus position, for example, a search is made for finding out the focus positions, for example, brining the amplitude of a densest signal (for example, 3T-3T signal) in the DMA area up to the maximum (max) and also brining the amplitude of a thin or sparse signal (for example, a signal having width equal to 6T and larger than that (as a typical example thereof is 8T-8T signal)) up to the maximum (max) (or saturated), and then the focus position is set at in between them (for example, at an intermediate value thereof). This means that, although a beam spot width comes to be small in the track advancing direction when the densest signal is at the maximum, but there is a possibility that it is widen in the direction perpendicular to the track, on the other hand the most sparse signal comes to be large in the beam spot width when it is at the maximum, but there is a possibility that it is narrowed in the direction perpendicular to the track. In between them, there is a focus position at which the beam spot comes into so-called a minimum blur circle, i.e., being small in both directions, the track advancing direction and the direction perpendicular thereto, and thereby being suitable for recording/reproducing. Further, in that instance, since the appropriate adjustment cannot be achieved when it is impossible to reproduce the DMA area (portion) due to the damages or defects thereof, then the following treatment will be conducted.

Thus, on the production line or the like, for example, into a memory building up part of the μ computer 400 mentioned above is memorized the following information, in advance; i.e., the focus position (P dense signal$_{max}$) for bringing the above-mentioned dense signal up to the maximum (max), the focus position (P sparse signal$_{max}$) for bringing the above-mentioned sparse signal up to the maximum (max), and the focus position ($PPID_{max}$) for brining the amplitude of the PID signal up to the maximum (max), which can be obtained by changing the focus portion in the DMA area (i.e., under the focus position control loop).

Figure 7:
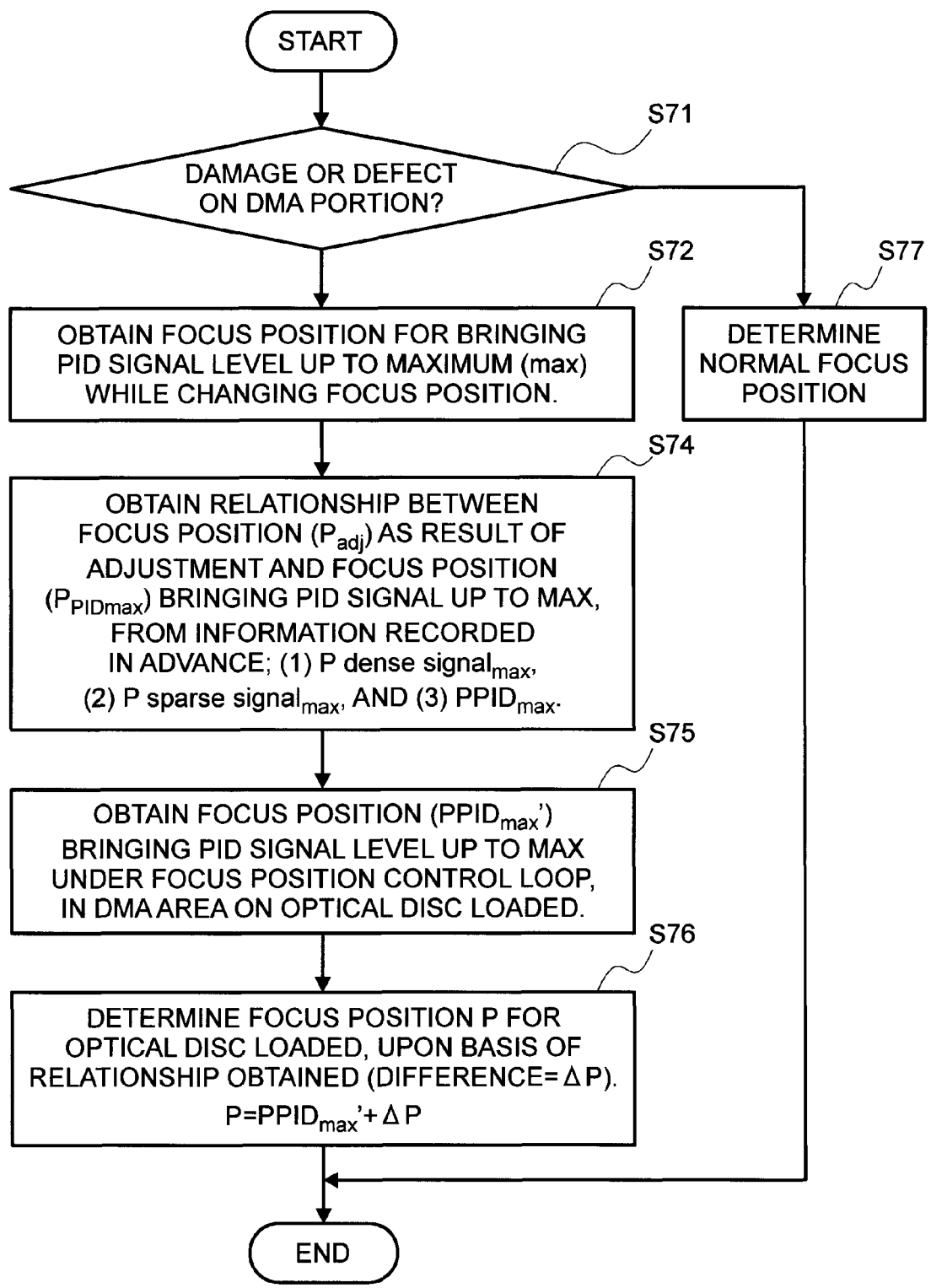
FIG. 7 is a flowchart for showing steps of the processing in a focus position adjusting method for an optical disc within the optical disc apparatus mentioned above.

Thereafter, when conducting the recording/reproducing operation while loading the optical disc within the apparatus, the data (i.e., the focus position information) recorded in the DMA area is reproduced, thereby conducting the optimal position control of the focus position. However, as a result thereof, if defects are in that DMA area, then after loading the optical disc, processing is conducted, which is shown in FIG. 7 attached herewith. However, this processing is executed in the μ computer 400 mentioned above, in accordance with software memorized in the memory, i.e., a part thereof.

In this FIG. 7, when the process is started, firstly, determination is made on whether the defects are in that DMA area or not (i.e., reproduction can be made or on due to the damage or defects) (S71), and as a result thereof, if there is no defect ("NO"), i.e., in case where the defect information management information in that DMA area can be read out, a normal focus adjustment is executed with the amplitude information thereof (S77).

On the other hand, in case when the result of determination (S71) mentioned above in that there is/are defect(s) in that DMA area ("YES"), then at first is obtained such a focus position (S72) that the PID signal level is at the maximum (max) in that DMA area while changing the focus position (i.e., un the focus control loop) (S73). Next, from the following information, which was memorized in advance, in the above; i.e., (1) the focus position (P dense signal$_{max}$) brining the above-mentioned dense signal up to the maximum (max), (2) the focus position (P sparse signal$_{max}$) brining the above-mentioned thin signal up to the maximum (max), and (3) the focus position (PPID$_{max}$) brining the PID signal up to the maximum (max), a relationship (for example, the difference) is obtained as below, for example, between the focus position (P$_{adj}$) as the result of adjustment on the focus position and the focus position (P$_{PIDmax}$) for bringing the level of PID (Physical Identification) signal up to the maximum (max) (S74).

$$(P\text{ dense signal}_{max} + P\text{ sparse signal}_{max})/2 - PPID_{max} = \Delta P$$

Further, in FIGS. 8(a) and 8(b) attached herewith are shown various kinds of relationships, between the focus position and the amplitude, on the DVD-RAM mentioned above, wherein in the figure, "L" indicates the focus position on the land, and "G" the focus position in the groove, respectively. And, the information (i.e., adjustment values) in relation to those focus positions are stored, within the memory, such as, EEPROM or the like, for example.

Thereafter, further, within the DMA area of the optical disc, which is loaded within the apparatus, while changing the focus position (i.e., under the focus position control loop), the focus position (PPID$_{max}$') is obtained, brining the level of the PID signal up to the maximum (max) (S75), and next, the focus position P is determined (S76), for the optical disc loaded therein, as follows, by taking the relationship (difference=$\Delta P$) between the focus position (P$_{adj}$) as the result of adjustment, which is obtained in the above, and the focus position (PPID$_{max}$) brining the level of PID signal up to the maximum (max), into the consideration (i.e., modify), and thereby completing a series of processing.

$$P = PPID_{max}' + \Delta P$$

Thus, with using the relationship between the focus position (P$_{adj}$) as the result of adjusting the focus position obtained in advance, i.e., the P dense signal$_{max}$ and the PPID$_{max}$, and the focus position (P$_{PIDmax}$) brining up the level of PID signal to the maximum (max), in more details, the difference between them (=$\Delta P$), since the PID signal mentioned above can be detected within that DMA area, even when the defects are in that DMA area of the optical disc, therefore it is possible to obtain the focus position (P$_{PIDmax}$) for bringing the level thereof up to the maximum (max). And, with this fact, upon basis of the relationship mentioned above (i.e., the difference=$\Delta P$), it is possible to adjust the focus position, appropriately, for the optical disc loaded.

However, on the production line of the apparatus, normally, the focus position adjustment is conducted while loading an optical disc for test use therein, and thereafter, conducting the recording/reproducing, thereby achieving the performance test of that apparatus. In that instance, determination of the focus position adjustment is conducted, normally, upon basis of the error rate through the recording/reproducing operation, i.e., confirmation is made on whether preferable recording/reproducing is made or not. And, if the error rate is not preferable, then reproducing is made, again, while changing the focus position within that area where the recording is done, so that the error rate falls down to the minimum (min). Then, according to the exemplary embodiment of the present invention, on the production line, in advance, for the purpose of memorizing the information (e.g., the relationship) wherein the focus position (P$_{adj}$) as the result of adjusting the focus position and the focus position (P$_{PIDmax}$) for bringing the level of the PID (Physical Identification) signal up to the maximum (max), it is preferable to conduct a test, again, under that condition, and recording the focus position as well.

Thus, if recording therein that the error rate is at the minimum (min), the focus adjustment must be done within the area recording a neighboring track on which Cross Talk is generated, and in such case, it is generated, in particular, mainly when the light spot is widen in the direction perpendicular to the track. However, in the DMA area mentioned above, no recording is made on both tracks neighboring to each other (i.e., the land area and the groove area), it is impossible for such the apparatus to make an adjustment appropriately. On the contrary to this, since the recording/reproducing are conducted over several tens tracks at the time when testing on the production line, there should be any area where the neighboring track is recorded, and an adjustment can be made, appropriately much more, and therefore it is preferable.

However, in the example mentioned above, determination is made on the focus position by taking the above-mentioned difference into the consideration, from the focus position (PPID$_{max}$') upon which the adjustment is made after loading (e.g., amending by adding or by subtracting); but this is because of the reason that, in an apparatus for recording/reproducing the high-density information recording medium having a large Cross Talk, such as, above-mentioned the DVD-RAM, etc., it is impossible to determined the appropriate focus position only by the signal level (for example, the RF signal), which can be obtained from the disc surface thereof.

Further, in the example mentioned above, as the method for obtaining the most suitable focus position from the focus position where the densest signal (for example, 3T signal) in the DMA area is at the maximum (max) and the focus position for bringing the sparse signal saturated on the amplitude thereof (for example, the signal having width equal to 6T or greater than that) up to the maximum (max), as was mentioned previously, the explanation was made on an adjusting method without being influenced by recording signal, while measuring the focus position for brining the amplitude of each of the dense signal and the sparse signal, such as, a long mark or a long space, for example, to be the largest, the adjustment is made at the most suitable position, the focus portion is adjusted at the most suitable position at which the radius of the light spot comes into the minimum blue circle, in the middle thereof; however, depending upon the optical pickup, there are some, in which the blue circle and the focus position where the dense signal becomes the largest are coincident with. Then, in the focus position adjustment, it may be determined, whether it should be located in the middle between the position where the dense signal is at the maximum or the position where the sparse signal is at the maximum, through estimation of the characteristics of the optical pickup. Other than that mentioned above, in the middle between the position where the dense signal is at the maximum or the position where the sparse signal is at the maximum, the focus position may be adjusted at a position of a ratio, 2:1, for example.

Figure 9:
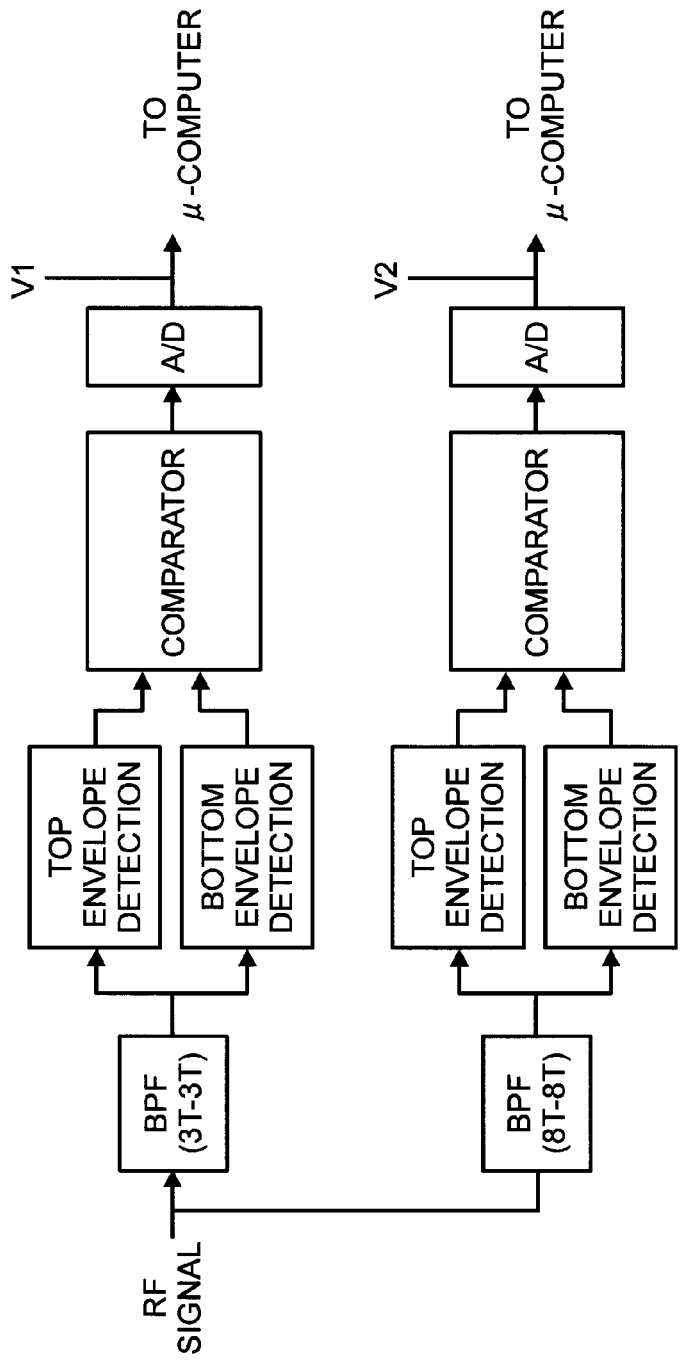
FIG. 9 is a view for showing an example of a concrete circuit diagram for obtaining a focus position for brining a densest signal (3T signal) up to the maximum (max) and brining a sparse signal (for example, a signal having width equal to 6T and larger than that), being saturated on the amplitude thereof, up to the maximum (max)
Figure 10:
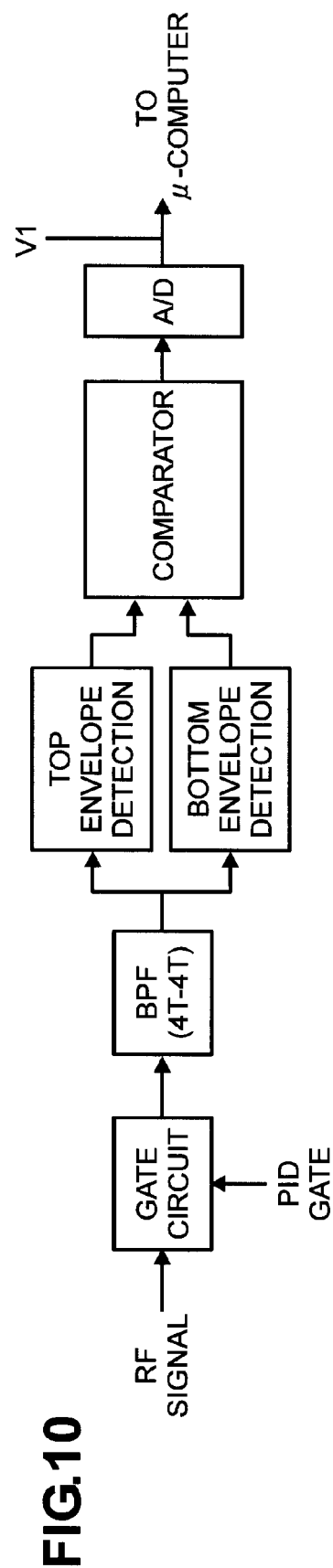
FIG. 10 is a view for showing an example of a concrete circuit diagram for obtaining the focus position for brining the amplitude of PID signal up to the maximum (max).

Also, an example of the detailed circuit structures for obtaining the focus positions for bringing the densest signal (e.g., 3T signal) up to the maximum (max) and for brining the sparse signal saturated on the amplitude thereof (for example, the signal having width equal to 6T or greater than that) up to the maximum (max) is shown in FIG. 9, and an example of the detailed circuit structures for obtaining the focus position for brining the amplitude of the PID signal presents to the maximum (max) in FIG. 10 attached herewith.

Also, since the focus positions for brining the dense signal and the sparse signal are at the maximum (max), in spite of difference of quality of recording signal, are the same, therefore it is possible to make the adjustment, appropriately, even with the signal having a large number of errors because of inappropriate recording power. In particular, with the DVD-RAM, the disc available on the market is provided with the DMA (Defect Management Area), which was recorded in advance. This is an area for recording alternation information, so-called, Primary Defect List (PDL) and Secondary Defect List (SDL), therein, and is provided at two (2) positions in the most inner periphery portion of the disc and at two (2) positions in the most outer periphery portion thereof. This portion is rewritten if defects are on the recording area when recording under the condition there is "Verify", and as a result thereof, rewriting is conducted in a space area, for the purpose of renewal of the information. Thus, conducting the focus position adjustment in this area enables the adjustment even on a Blank (non-recorded) disc, which is purchased on the market.

However, a problem when conducting the adjustment in this area is that, since this area is a limited portion, the adjustment cannot be made when it is defected or lost due to scratches or unclearness. As a method for dealing with such the problem, as was also mentioned in the above conventional art, after recording in a Disc test area, then adjustment may be made on that portion. However, with his method, it takes a time until the apparatus comes into the condition of enabling the recording/reproducing, and therefore it is inferior in usability (not user-friendly).

Then, according to the exemplary embodiment of the present invention, it is preferable to obtain further the information of the signals, which are obtainable by shifting the position not to be affected with the ill influences due to the scratches and the unclearness, and the information of the focus position thereof, other than the focus position brining the dense signal and the sparse signal up to the maximum in the amplitude thereof when adjusting the focus position. And, further, other than the amplitude of the PID (Physical ID) signal mentioned above, there can be considered a Wobble amplitude and/or Push-Pull amplitude, for example. In particular, as a preferable exemplary embodiment of the present invention, it is preferable to obtain the information of the focus position for bringing the amplitude of VFO (i.e., 4T-4T repetition signal, for use of synchronism with the phase of Date PLL) portion of the PID signal mentioned above (PID=VFO amplitude) up to the maximum. However, this PID signal is one which is pre-write as an address signal in the RAM area on the DVD-RAM disc, and is provided for every sector on the entire surface of the disc (in total, there are 2,376,143 sectors).

Also, when conducting the focus position adjustment mentioned above, it is possible to record the focus position for brining about the dense signal at the maximum, the sparse signal at the maximum, and DID-VFO at the maximum, into a non-volatile memory, such as, EEPROM, etc., for example, and thereafter, to determine the focus position at a predetermined ratio, at which the dense signal and the sparse signal can be obtained at the maximum. Further, it is preferable to conduct the focus position adjustment, as was mentioned previously, on both the most inner periphery and the most outer periphery of the disc, and to determine the focus position, linearly, between them. However, since the test is conducted on the production line, basically, there is no chance of omitting the DMA mentioned above, and therefore the adjustment can be completed, normally. However, when the DMA is omitted, it is also possible to determine at the position for brining the DID-VFO at the maximum. Thereafter, if the DMA is not omitted when loading the disc, then in the similar manner to the above, measurement may be conducted so as to determine the focus position at the predetermined ratio for brining about the dense signal at the maximum and the sparse signal at the maximum.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A method for adjusting a focus position for an optical disc, onto/from which information is recorded or reproduced, while adjusting the focus position of an optical reproducing means, upon a recording surface of an optical information recording medium having an area where information of said optical information recording medium is recorded in advance, comprising the following steps of:

memorizing plural numbers of information relating to focus positions determined appropriately, which can be obtained from the area where the information of said optical information recording medium is recorded in advance; and adjusting the focus position for said optical disc loaded into an apparatus, from at lease one (1) signal relating to the focus position, which can be obtained from said optical disc, with utilizing a relationship between said plural numbers of information relating to the focus positions determined appropriately, memorized in advance, when reproduction of said information is impossible when the optical disc is loaded into said apparatus, wherein the plural numbers of information, which can be obtained from the area where the information is recorded in advance, includes a focus position for brining amplitude of a densest signal up to a maximum, a focus position for bringing amplitude of a sparse signal up to a maximum, and a focus position for bringing amplitude of a PID (Physical Identification Data) signal up to a maximum.

2. The method for adjusting a focus position for an optical disc, as described in the claim 1, wherein at least one (1) signal relating to the focus position obtainable from said optical disc is said pro signal, if the information cannot be reproduced from the area where the information is recorded in advance, when loading the optical disc into said apparatus.

3. An optical disc apparatus, for recording or reproducing information onto/from an optical information recording medium having an area where information is recorded in advance, in a part thereof, comprising, at least:

a unit, which is configured to rotationally drive the optical information recording medium loaded into said apparatus;

an optical reproducing unit, which is configured to irradiate a light beam for recording/reproducing the information upon a recording surface of the optical information recording medium, which is rotationally driven by said rotationally driving unit; and a controller unit, which is configured to adjusting a position of said optical reproducing unit in a radial direction of the optical information recording medium, and also a focus portion of the light beam irradiated upon the recording surface of said optical information recording medium, wherein said controller unit memorizes plural numbers of information relating to focus positions determined appropriately, which can be obtained from the area where the information of said optical information recording medium is recorded in advance; and adjusts the focus position for said optical disc loaded into an apparatus, from at lease one (1) signal relating to the focus position, which can be obtained from said optical disc, with utilizing a relationship between said plural numbers of information relating to the focus positions determined appropriately, memorized in advance, when reproduction of said information is impossible when the optical disc is loaded into said apparatus, wherein the plural numbers of information, which can be obtained from the area where the information is recorded in advance by said controller unit, includes a focus position for brining amplitude of a densest signal up to a maximum, a focus position for bringing amplitude of a sparse signal up to a maximum, and a focus position for bringing amplitude of a PID Physical Identification Data) signal up to a maximum.

4. The optical disc apparatus, as described in the claim 3, wherein at least one (1) signal relating to the focus position obtainable from said optical disc is said PIO signal, if the information cannot be reproduced from the area where the information is recorded in advance, when loading the optical disc into said apparatus.

* * * * *